United States Patent Office

3,461,052
Patented Aug. 12, 1969

3,461,052
PROCESS FOR PRODUCING GRAFT COPOLYMERS USING RADIATION
Alfred J. Restaino, Lawrence Township, and Weldon N. Reed, Pennington, N.J., assignors to Atlas Chemical Industries, Inc., Wilmington, Del., a corporation of Delaware
No Drawing. Application June 3, 1960, Ser. No. 33,614, which is a continuation-in-part of application Ser. No. 807,296, Apr. 20, 1959. Divided and this application Jan. 3, 1967, Ser. No. 635,275
Int. Cl. C07c 3/24; B01j 1/10; C08f 1/16
U.S. Cl. 204—159.12      2 Claims

ABSTRACT OF THE DISCLOSURE

A process for the radiation induced grafting of vinyl monomers to hydrophilic polymeric substrates, particularly polyvinyl alcohol, is disclosed. The substrate moistened with water is contacted with a fluid vinyl monomer capable of free radical catalyzed polymerization and irradiated with high energy ionizing radiation to a dosage of 2000 to $10^8$ roentgens.

---

This is a division of application Ser. No. 33,614 filed June 3, 1960 which, in turn, is a continuation-in-part of application Ser. No. 807,296 filed Apr. 20, 1959, and now abandoned.

This invention relates to the grafting of vinyl compounds to polymeric substrates by copolymerization and to certain graft copolymers prepared by such process. More particularly it relates to an improved process for conducting such graft copolymerizations under the influence of ionizing radiation and to starch-vinyl graft copolymers so-prepared.

It is known to modify the properties of polymer substance by treatment with a polymerizable monomer different from that forming the structural units of the polymeric susbtances, under conditions such that the monomer forms a copolymer with the said polymeric substance. The monomer is said to be grafted onto the polymeric substance, the process is referred to as graft copolymerization and the resulting modified product is called a graft copolymer.

The present invention relates to the formation of graft copolymers of substrates which are organic hydrophilic polar polymers under the influence of ionizing radiation and employing polymerizable vinyl compounds singly or in admixture as the monomers to be grafted thereonto.

Types of ionizing radiation, as this term is well understood in the art, include high energy electromagnetic radiation such as gamma-rays and X-rays, high velocity electrons such as beta-rays from radioactive products and electrons accelerated by a suitable voltage gradient, alpha particles, protons, deuterons, neutrons, and the like. Convenient sources of such radiations include atomic piles, electron or particle accelerators, radioactive isotopes and X-ray equipment. The preferred type of radiation in the practice of the invention is high intensity gamma radiation such as may be obtained from nuclear fission byproducts and from materials made radioactive by neutron radiation. Radioactive cobalt ($Co^{60}$) exemplifies this last named source of high energy radiation.

The substrates to which the vinyl monomers are grafted in accordance with the invention are organic hydrophilic polar polymers, which polymers are characterized by their ability to soak up and retain at least 25% of their own weight of water or to dissolve in water. For the sake of brevity they will be referred to hereinafter as hydrophilic substrates. Such polymers may be naturally occurring or may be of synthetic origin. Among suitable substrate materials there may be named cellulose, wool, starch, alginic acid and the alginates, vegetable gums such, for example, as locust bean gum, guar flour, or gum tragacanth, gelatin, casein, pectin, polyvinyl alcohol, hydrophile high molecular weight polyalkylene glycols, and the like. The form of the polymeric substrate may be as desired, i.e., it may be in the form of a powder, short fibers, long filaments, felted, fibrous mats, spun yarns, foils or the like. Particularly valuable compositions have been obtained by grafting vinyl monomers onto starch in accordance with the invention.

Vinyl monomers suitable for grafting to hydrophilic substrates in accordance with the invention are those vinyl compounds which are capable of free radial catalyzed polymerization, such for example as vinyl acetate, acrylic acid and its esters, methacrylic acid and its esters, acrylamide, acrylonitrile, styrene, vinyl toluene, vinyl pyridine, alkyl vinyl pyridines, divinyl benzene, butadiene, N,N-methylene bis-acrylamide, and the like. The vinyl monomers may be grafted to the substrate singly, in admixture or sequentially.

The process of the present invention comprises contacting the vinyl monomer in fluid, preferably liquid, form with moist substrate irradiated with ionizing radiation. The irradiation of the moist substrate may be effected prior to its contact with the fluid monomer or while it is in contact therewith. In the foregoing, and throughout this specification and in the appended claims the terms "moist" and "moisture" refer to the presence of water as the moistening liquid. The degree of moistening may vary over a wide range. As little as 10% by weight of water on the hydrophilic substrate markedly increases the rate of grafting. Increasing the ratio of water to substrate, up to the amount that the latter will mechanically hold, progressively increases the rate of grafting. The presence of still larger proportions of water so that an aqueous phase is formed does not inhibit sensitization of the polymeric substrate to grafting under the influence of high energy ionizing radiation but may tend to mechanically separate the vinyl monomer therefrom and thus prevent or hinder the copolymerization. Vigorous agitation of the system will in large measure counteract such mechanical separation and thus permit the use of excessive amounts of water if desired. In general, however, it is preferred to moisten the substrate with no more water than the latter will imbibe without the formation of a supernatant liquid phase. This amount will vary greatly according to the choice of substrate. Thus, cellulose will imbibe up to 300% or even more of its own weight of water without forming a supernatant phase whereas starch is completely saturated by approximately 80% of its own weight of water.

A preferred procedure, then, is to moisten the hydrophilic substrate with from about 30% to about 100% of the amount of water it will imbibe without formation of a supernatant phase, immerse the moistened substance in the chosen vinyl monomer or monomers, or in a solution thereof in an inert solvent, subject the suspension to gamma-ray irradiation, remove it from the radiation field and separate the formed graft copolymer from unreacted and homopolymerized monomer.

The radiation dose may vary over a considerable range and will depend on the extent of grafting desired, the choice of substrate, the amount of moisture in the system and on the nature of the monomer. Radiation intensities for highly reactive systems may be as low as 500 roentgens per hour. In the interest of rapid grafting higher intensities are usually preferred such as $10^4$ to $5 \times 10^6$ r./hr. As will be readily recognized by those skilled in the art the time of exposure to the radiation will vary directly with the dose desired and inversely with the radiation intensity. In highly reactive systems and with the substrate thoroughly saturated with water successful grafting may be effected with as little as 2000 roentgens radiation.

Higher radiation doses, up to and even exceeding $10^8$ roentgens may be employed. Obviously, if the substrate undergoes depolymerization or degradation under the effect of radiation and it is desired to retain the polymeric structure of the substrate the dose must be correspondingly limited. Thus, when grafting onto cellulose, excessive degradation is avoided by keeping the radiation dose below about $10^6$ roentgens. Useful graft copolymers of cellulose degradation products may, however, be obtained by employing higher radiation doses.

Monomers which are very readily homopolymerized under the influence of ionizing radiation, i.e., monomers with a high C-value for free radical formation and possessing high ratios of propagation to termination rates, are preferably diluted with a solvent while the suspension of moist substrate therein is being irradiated. Homopolymerization is thus suppressed. Suitable solvents are liquids in which the vinyl monomer is soluble and which have a lower G-value for free radical formation than does the monomer itself and particularly such solvents which are capable of excitation energy transfer. Aromatic hydrocarbons, e.g., benzene or toluene, are suitable solvents for many vinyl monomers.

Monomers in which water is soluble to any considerable extent are likewise preferably diluted with a solvent of low G-value before suspending the hydrophilic polymer therein. The solvent should be selected to decrease solubility of water in the liquid phase, thereby minimizing extraction of water from the substrate before the ionizing radiation is applied thereto.

The following examples illustrate the preparation of graft copolymers in accordance with the invention.

Example I

A piece of dried filter paper weighing 0.0735 gram was immersed in water until it was thoroughly soaked. Excess water was shaken off and the paper reweighed. It had picked up 0.2205 gram of water. The moist paper was inserted in a glass tube to which was added 5 ml. of a 10% (1.48 molar) solution of monomeric acrylic acid in benzene. The system was degassed by submerging the tube in liquid nitrogen, applying high vacuum thereto, and sealing it off. The tube and its contents were allowed to return to room temperature and placed in a $Co^{60}$ irradiation source under an intensity of $10.5 \times 10^4$ r./hr. for 20 minutes. The tube was removed from the irradiation source and the contents removed therefrom. Unreacted monomer and any polyacrylic acid (homopolymer) were separated by first washing with 5% sodium hydroxide solution for 16 hours, then with 3% hydrochloric acid for one hour and finally with warm distilled water. The remaining graft copolymer of acrylic acid on cellulose was dried and reweighed, and was found to have gained 23.6% in weight over that of the original filter paper so that the graft copolymer contained 19.7% acrylic acid units by weight.

The product was soluble in cupri-ethylene diamine but, unlike an ungrafted control sample, showed good dyeability with dyes containing basic groups (methylene blue, for example).

Dry filter paper immersed in acrylic acid solution of the same concentration and subjected to the same degassing, irradiation dose and separation procedure as the foregoing showed no gain in weight at all.

Example II 2.1715 grams of surgical cotton were soaked in water, removed and drained. The amount of water retained in the mass was 4.7773 grams. The wet mass was transferred to polymerization tube and covered with 12 ml. of a 20% (2.95 molar) solution of acrylic acid in benzene. The sample was degassed as in the foregoing example and irradiated for 30 minutes in the same $Co^{60}$ source.

Upon separating unreacted monomer and polyacrylic acid the technique described in Example I the product was found to contain 5% of acrylic acid based on the total weight of copolymer grafted onto the fibrous cotton. The graft copolymer had cation exchange properties. Tap water containing cupric ion passed through a filter plug of the graft copolymer showed no detectable amount of copper in the effluent. At exhaustion, the copolymer had bound 1 mol of copper ion for each 2 mols of acrylic acid in the copolymer. Treatment of the filter plug with dilute HCl regenerated its copper absorptive capacity.

Example III 2.68 grams of filter paper which had soaked up 6.4 grams of water was submerged in 15 ml. of distilled methyl methacrylate, degassed and irradiated for 25 minutes by the method described in Example I. Unreacted monomer and homopolymer were separated from the formed graft copolymer by washing for 16 hours in acetone. The separated graft copolymer contained 51% methyl methacrylate.

Filter paper subjected to the same procedure except that it was processed dry instead of wet, and was irradiated for 30 minutes instead of 25 minutes, showed no gain in weight.

Samples of the methyl methacrylate grafted paper and ungrafted paper were exposed to air at 200° C. for 1 hour. The control turned a deep brown in color whereas the graft copolymer showed only slight yellowing.

Example IV 4.0 grams of a highly refined alpha cellulose from wood pulp (BW-200 Solka-Floc) was wet with 12.0 grams of water, and submerged in 6 grams of distilled styrene, degassed and irradiated for 15.5 hours in the manner described in Example I. The product was washed for 16 hours with benzene to extract monomeric and polymeric styrene from the graft copolymer of styrene on cellulose. The graft copolymer contained 22% styrene and 78% cellulose.

The styrene grafted cellulose was acetylated by techniques common to the acetylation of cellulose and the reaction went normally. The acetylated product was soluble in a mixture of 2 parts acetone in 1 part benzene.

Discs were molded of the acetylated cellulose-styrene graft copolymer and compared in hardness with discs molded from cellulose acetate and from polystyrene, respectively. Barcol hardness values were as follows:

Cellulose acetate _____ 20–26
Polystyrene _____ 0–5
Acetate of Example IV graft copolymer _____ 27–32

Example V

Another styrene graft on cellulose was prepared from 2 grams of surgical cotton wet with 6 grams of water immersed in 5.0 grams of distilled styrene and irradiated for 18 hours under the conditions of the foregoing examples. The graft contained 35% styrene. It was more resistant to wetting than a control portion of the cotton employed in forming the graft and in a comparison dyeing experiment took up more Pontamine Fast Red 8 BLX from a 1% solution thereof than did cotton.

Example VI 3.41 grams of filter paper wet with 8 grams of water was submerged in 20 ml. of 4-vinyl pyridine, degassed and irradiated for 3 hours by the technique described in Example I. The graft copolymer was separated from unreacted and homopolymerized vinyl pyridine by washing first with 5% aqueous hydrochloric acid for 2 hours, than with 5% ammonium hydroxide for 2 hours and finally with warm distilled water. The graft copolymer formed contained 11.4% of 4-vinyl pyridine.

The product was found to be readily dyeable with dyes containing acid groups. For example a portion of the graft-copolymer and a portion of ungrafted filter paper, respectively were impregnated with methyl orange solution. After 3 washings with water the control (ungrafted paper) retained no visible trace of the dye. By way of contrast the graft copolymer, after 10 washings in a solution of a commercial synthetic detergent and 10 days storage under water showed no visible loss of the dye.

In the foregoing examples the moist cellulose was irradiated in the presence of the grafting vinyl monomer. It is within the purview of the invention to irradiate moist cellulose and subsequently bring it into contact with a vinyl monomer whereupon the formation of a graft copolymer takes place. The following examples illustrate this technique.

Example VII 0.079 gram of filter paper wet with 0.236 gram of water was introduced into a polymerization tube fitted with a stopcock. The contents of the tube were degassed by the process described in Example I, the stopcock closed, and the tube with its contents irradiated with $10.5 \times 10^4$ r./hr. cobalt-60 gamma-rays for 30 minutes. The tube was removed from the irradiation source and the stopcock tube connected to a vessel of degassed methyl methacrylate. The stopcock was opened cautiously and 3.10 grams of the vinyl monomer vacuum distilled into the tube containing the irradiated cellulose. Contact between the cellulose and the distilled monomer was maintained for 24 hours at 25° C. after which the tube was opened and the contents poured into an excess of acetone and washed for 48 hours to remove unreacted monomer and homopolymer of methyl methacrylate. The resulting copolymer was found to contain 39.3% grafted methyl methacrylate.

Example VIII 0.0275 gram of filter paper wet with 0.0825 gram of water was subjected to the same procedure as the filter paper of Example VII through the step of irradiation. 1.41 grams of methyl methacrylate was vacuum distilled into the polymerization tube and allowed to remain in contact with the irradiated cellulose for 70 hours at 20° C. After separation of methyl methacrylate monomer and homopolymer by the process described in the preceding example the recovered graft copolymer was found to contain 70.3% methyl methacrylate.

In a companion experiment 0.0855 gram dry cellulose was irradiattd in the same way and contacted with 3.76 grams methyl methacrylate for 65 hours at 25° C. The cellulose took up only 4.7% of its weight of methyl methacrylate.

Example XIX 5 ml. of water was added to 1.20 grams of starch (amylopectin). 5 ml. of distilled methyl methacrylate monomer was then added and the sample degassed by the procedure described in Example I. The tube containing the sample was irradiated for 48 minutes with gamma-rays from Co[60] at an intensity of $10.5 \times 10^4$ r./hr. After removal from the radiation source the contents of the tube were poured into 500 ml. of acetone and the suspension agitated overnight. The supernatant liquid, too gelatinous to pass through a sintered glass filter was decanted and the solid residue washed again with two more 500 ml. portions of acetone. The last portion was filterable and was separated from the solid residue by filtration. The precipitate was washed once with acetone and dried to constant weight at 115° C. The dried graft copolymer weighed 1.41 grams indicating that it contained 14.9% grafted methyl methacrylate.

In a companion experiment dry starch was subjected to the same irradiation dose and washing treatment. It showed no gain in weight.

Example XX

Hot (90° C.) distilled water was poured over a film of deplasticized polyvinyl alcohol weighing 0.0619 gram. The film swelled and flowed into a soft mass weighing 0.5261 gram. The mass was transferred to a polymerization tube and covered with 5 ml. of distilled methyl methacrylate monomer. After degassing and sealing, the tube and its contents were irradiated for 60 minutes in the gamma-ray source described in the preceding examples. The mass of polyvinyl alcohol had become noticeably larger. The sample was extracted overnight with acetone to remove unreacted and homopolymerized methyl methacrylate, and dried to constant weight at 115° C. The graft copolymer weighed 0.4126 gram from which it is calculated that it contained 87% vinyl monomer.

Example XXI 1.10 grams of degreased raw wool was immersed in water, the excess water drained off and the wet wool transferred to a polymerization tube. 5 ml. distilled methyl methacrylate monomer was added and air displaced from the tube by flushing with nitrogen. The tube and its contents were irradiated for 45 minutes in the gamma radiation source described in the foregoing examples. Upon

| Example No. | Form and weight of cellulose (grams filter paper) | Weight of water (grams) | Vinyl monomer form and amount | Irradiation time (min.) | Separation of monomer and homopolymer | Percent vinyl compound in graft copolymer |
|---|---|---|---|---|---|---|
| IX | 0.033 | 0.099 | 4 ml. acrylonitrile | 23 | Wash with dimethyl formamide 16 hours. | 17.0 |
| X | 0.032 | 0.096 | 4 ml. 3.78 molar acrylamide in 1:2.5 methanol:benzene solution. | 30 | Wash in warm water 16 hours. | 22.9 |
| XI | 0.044 | 0.113 | 4 ml. sat'd .solution of N,N-methylene bisacrylamide in methanol. | 55 | ....do.... | 17.6 |
| XII | 0.035 | 0.104 | 4 ml. distilled methyl acrylate | 100 | Wash with acetone 5 hours | 30.0 |
| XIII | 0.022 | 0.066 | 4 ml. distilled vinyl acetate | 35 | Wash with benzene 16 hours. | 6.8 |
| XIV | 0.033 | 0.100 | 4 ml. distilled butadiene | [2]92.5 | ....do.... | 32.0 |
| XV | 0.036 | 0.108 | 4 ml. distilled vinyl triethoxysilane | [2]110 | Extract with boiling benzene. | 29.4 |
| XVI | [3]2.8 | 5.8 | 10 grams distilled methyl methacrylate | 28 | Wash with acetone 16 hours. | 58.0 |
| XVII | 0.061 | [1]0.015 | 10 ml. distilled methyl methacrylate | 17 | ....do.... | 3.3 |
| XVIII | 0.069 | [1]0.069 | ....do.... | 17 | ....do.... | 35.0 |

[1] The dry filter paper and the weighed amount of water were placed in the polymerization tube and equilibrated before adding the vinyl monomer.
[2] Hours.
[3] Grams cellophane.

Further examples are presented in tabular form above to illustrate application of the process of the invention in grafting various vinyl monomers to cellulose of different forms and under varying operative conditions. In each case the irradiation was with Co[60] gamma-rays of $10.5 \times 10^4$ roentgens per hour.

The grafting of vinyl monomers to hydrophilic polymeric substrates other than cellulose in accordance with the invention is illustrated in the following examples.

separation of the fibers from vinyl monomer and homopolymers they were found to have increased in weight by 0.-18 gram. Thus the wool-methyl methacrylate graft copolymer contained 14% of the vinyl component.

Dry wool treated in the same manner did not gain in weight.

More than one vinyl monomer may be grafted onto cellulose or like polymeric substrate, either serially or simultaneously as the following examples illustrate.

Example XXII 0.1800 gram of a cellulose-methyl methacrylate graft copolymer containing 52% methyl methacrylate was moistened by soaking in water, transferred to a polymerization tube and covered with a solution of 3 ml. 4-vinyl pyridine in 1 ml. pyridine. The sample was degassed as described in Example I and irradiated for 48 minutes in the gamma ray source employed in the previous examples. The irradiated product was freed from solvent, monomer and homopolymer by washing in 5% hydrochloric acid for an hour, in 5% ammonium hydroxide for a half-hour and rinsing well with distilled water. The sheet was dried in an oven at 80° C. overnight and a desiccator for 3 days. The final weight was 0.2035 gram from which it may be calculated that the composition of the mixed graft copolymer is 42.4% cellulose, 46.0% methyl methacrylate, and 11.6% 4-vinyl pyridine.

Example XXIII

Wet filter paper was immersed in a mixture of 4 parts by volume methyl methacrylate and 1 part 4-vinyl pyridine. The sample was degassed and irradiated for 48 minutes in the manner and in the apparatus described in the foregoing examples. The irradiated product was freed from unreacted monomer and any polymerization products not grafted onto the cellulose by first extracting for 3 days in acetone and then washing with 5% hydrochloric acid, 5% ammonium hydroxide, and distilled water in succession. The graft copolymer was dried and weighed. From the weight gain it was found that the product contained 10.8% of the mixed vinyl monomer in the copolymer. Its nitrogen content was 1.08% which corresponds to 8.1% vinyl pyridine. By difference, the methyl methacrylate content of the copolymer was 2.7%.

Particularly valuable graft copolymers prepared in accordance with the invention are those employing starch as the substrate. Vinyl monomers have been grafted to various grades of starch, ranging from completely water soluble (high amylose) through cornstarch (approximately 72% amylopectin) to amylopectin under the influence of high energy ionizing radiation. The grafting efficiency, when the starch is moistened with water, appears to be equally good for the several grades of starch.

Example XXIV 673.0 grams of distilled water was added to 1204.0 grams of dried corn starch. 3000 mls. of distilled styrene monomer was then added and the mixture was deaerated by flushing with nitrogen. The vessel containing the sample was irradiated for 7.5 hours with gamma-rays from spent fuel elements at an average intensity of $7.5 \times 10^4$ r./hr. After removal from the radiation source the contents of the vessel were poured into 2.5 gallons of benzene and the suspension agitated overnight. The supernatant liquid was decanted and the solid residue washed again with two more 2.5 gallon portions of benzene. The last portion was separated from the solid residue by filtration. The precipitate, thus freed from styrene monomer and homopolymer, was washed once with methanol and dried to constant weight at 80° C. The dried graft copolymer weighed 2014.0 grams indicating that it contained 40.22% grafted styrene. Residual nongrafted amylose was removed subsequently by hot water extraction, leaving a starch styrene graft copolymer containing 56.1% grafted styrene.

The product was a fine white powder, insoluble in water and in the common organic solvents. It softened without decomposition and could be molded into hard shapes at 150° C. and 5,000 pounds per square inch pressure.

Impact strength and hardness of discs so molded were comparable to those of polystyrene. In solvent resistance and heat distortion they were considerably superior to polystyrene.

The starch-styrene graft copolymer can be suspended in benzene to form a very stable slurry suitable for application to textiles as a sizing agent.

Example XXV

A portion of the final starch-styrene graft copolymer of Example XXIV was acetylated by treatment with acetic anhydride-acetic acid sulfuric acid mixture in conventional manner to yield a product containing 1.6 acetate radicals per glucose unit of the starch-styrene copolymer. The product was a fine white powder soluble in dioxane, methyl ethyl ketone, chloroform and in benzene-acetone mixtures.

Pressed samples of cotton sheeting impregnated with the 1% acetone-benzene solution of the acetylated graft retained their crease after being immersed in water at room temperature for 5 days. Control samples impregnated with commercial grade liquid starch showed immediate loss of crease-resistance when immersed in the same water bath.

The application of the acetylated starch-styrene graft to improve the water resistance and wet strength of cellulosics is illustrated below.

Samples of soft tissue impregnated with the 1% acetylated graft copolymer acetone-benzene solution remained afloat after 5 days when placed in a water bath at room temperature. Untreated controls soaked water rapidly and sank immediately.

Paper treated with the acetylated copolymer from a 2% dioxane solution gave very good wet strength properties. Shear weights of the papers ranged from 1000 to 1500 grams which compare favorably with paper treated with urea-formaldehyde type resins (shear weights of 1500 grams).

Films can be cast on glass plates from the various solvent solutions.

Dioxane is a preferred solvent for film casting.

Example XXVI

Another portion of the starch-styrene graft copolymer of Example XXIV which contained 56.1% grafted styrene was dried in a convection oven at 105° C. and nitrated as follows:

637 grams of a phosphorous pentoxide-nitric acid nitrating mixture prepared as described by Alexander and Mitchell, Anal. Chem. 21, 1497 (1949), was placed in a 2 liter Erlenmeyer flask at room temperature and 15 grams of the graft copolymer added slowly to the nitrating mixture and stirred continuously for 24 hours. The excess acid was removed by filtration and the nitrated copolymer was neutralized using sodium carbonate solution. The product was washed three times with warm distilled water, rinsed once with methanol and dried in a vacuum desiccator.

The product was a light yellow powder and was found to contain 11.9% nitrogen, (1) distributed about equally between nitrate ester radicals and aromatic nitro groups, (2) it was insoluble in water but dissolved readily in benzene-acetone mixture if wetted with acetone first. The powder was insensitive to impact and appeared quite stable at temperatures up to 100° C. At about 190° C. it decomposed with explosive violence. It is useful as a component of explosive mixture.

Example XXVII 12.5 grams of distilled water was added to 25.00 grams of dried water soluble-potato powder (for iodometry). 30 mls. of spectro-grade benzene and 30 mls. of distilled vinyl acetate were then added to the wetted starch, thoroughly blended and degassed by the procedure described in Example I. The tube containing the sample was irradiated for 17 hours with gamma-rays from $Co^{60}$ at an intensity of $10.5 \times 10^4$ r./hr. After removal from the radiation source the contents of the tube were poured into 500 ml. of benzene and the suspension agitated overnight. The supernatant liquid was removed by filtration with suction through a Buchner funnel and the solid residue washed again with two more 500 ml. partions of benzene. The precipitate was washed once with methanol and dried to constant weight at 80° C. The dried graft copolymer weighed 32.90 grams indicating that it contained 24.00% grafted vinyl acetate.

The resulting product was a fine white powder that was insoluble in all common solvents. It softened without decomposition and could be molded at 150° C. and 5,000 pounds per square inch into hard shapes.

When stirred in boiling water the copolymer took on a smooth white cream-like texture. When stirred with 10% by weight of paraffin oil this white cream emulsified producing a fine textured cream.

Under the influence of ethanolic potassium hydroxide the acetate was hydrolyzed to yield the corresponding water-soluble polyvinyl alcohol-starch graft copolymer. This product was water-soluble and from its aqueous solution clear, flexible films resembling cellophane in appearance were cast.

Further to illustrate improvements conferred by forming graft copolymers in accordance with the invention untreated cotton yarn and the same yarn modified by grafting thereonto 9.6% by weight of methyl methacrylate were subjected to comparative tests with the results tabulated below.

| Property, measured | Yarn Untreated | Yarn Modified |
|---|---|---|
| Breaking strength (air dried) | 0.306 lbs | 0.609 lbs. |
| Breaking strength (wet) | 0.526 lbs | 0.678 lbs. |
| Percent elongation at break (air dried) | 4.9 | 4.9. |
| Percent elongation at break (wet) | 9.0 | 6.85. |
| Yarn stiffness (bending length) | 1.42 inches | 1.76 inches. |

The foregoing examples are presented for the purpose of illustrating the invention and pointing out many of its embodiments. They are not to be construed as limiting the scope thereof.

What is claimed is:

1. The process of forming a graft copolymer of polyvinyl alcohol and a vinyl monomer capable of free radical catalyzed polymerization which comprises contacting the said monomer in fluid form with water-moistened polyvinyl alcohol irradiated with high energy ionizing radiation to a dosage of from 2,000 to $10^8$ roentgens.

2. The process of claim 1 wherein the polyvinyl alcohol is moistened with water, the moistened polyvinyl alcohol is immersed in the said vinyl monomer and the said moistened polyvinyl alcohol while immersed in the said vinyl monomer is irradiated with the said high energy ionizing radiation.

References Cited

UNITED STATES PATENTS 3,157,527  11/1964  Fournet et al. _____ 260—885
2,956,899  10/1960  Cline _____ 117—47

MURRAY TILLMAN, Primary Examiner

R. B. TURER, Assistant Examiner

U.S. Cl. X.R.

204—159; 260—29, 875, 877, 879, 881, 882, 883, 885, 886